Patented Nov. 12, 1940

2,221,380

UNITED STATES PATENT OFFICE 2,221,380

METHOD OF RENOVATING USED OIL AND SYSTEM CONTAINING SAME

William G. Horsch, Woodbury, N. J., assignor to Socony-Vacuum Oil Company, Incorporated, New York, N. Y., a corporation of New York No Drawing. Application January 25, 1938, Serial No. 186,814

3 Claims. (Cl. 252—52)

Oils use for the lubrication of turbines and the like, and as a dielectric element in transformers and other electrical equipment are prone to deterioration during use, which results in the formation of sludge, a portion of which remains suspended in the oil, and another portion of which is deposited in the equipment wherein the oil was used, and especially in the small passages provided for the circulation of the oil therein. This invention is directed to a novel method of renovating such deteriorated oils, and also to a novel method of cleaning the equipment in which the oil has been used.

These sludges, formed by prolonged exposure to oxidizing conditions in the presence of catalytic metals, at low temperatures, are quite different from those formed at high temperatures. These sludges, formed usually at temperatures of about 225–250° F., have different characteristics from sludges formed at temperatures above about 300° F., the low temperature sludges frequently being difficult of removal to renovate the oil and permit its reuse.

Former methods of renovating these oils have contemplated the removal of the oil from the equipment, followed by a mechanical removal of the sludge as by filtration, settling, centrifuging, or the like, with return of the oil to the equipment. These processes do not clean the equipment of sludge precipitated therein, except by the flushing action of the returned cleaned oil. Cleaning of the equipment can be accomplished only by taking the equipment out of service and dismantling it. In many cases, the sludge remaining in the equipment contributes to a more rapid deterioration of the cleaned oil. In most cases, the methods of cleaning the oil do not completely remove the sludge, but rather remove only that portion of the sludge which is agglomerated sufficiently to be removed, leaving much finely divided sludge material in suspension to later agglomerate and deposit when the oil is returned to service.

It is an object of this invention to provide a method whereby used oils of these classes may be cleaned of suspended sludge materials, and whereby such materials, otherwise unremoved, may be rendered substantially incapable of reprecipitation. A further and important object is the provision of a method whereby the cleaning of the internal passages of the equipment may be accomplished without dismantling and in many cases without withdrawal from service. Other objects and advantages are in part obvious, and in part will appear later herein.

The herein described novel process for the renovation of oil to its original, sludge-free condition after oxidation from prolonged service at moderate temperatures has resulted in the formation of sludge, as well as for the cleaning in situ of the partially sludge-blocked passages of the equipment, is based upon the discovery that certain materials have the power of rendering the sludge soluble in the oil without impairing the electrical, heat-removing, or lubricating properties of the oil. The process herein disclosed consists in adding to the oil, after an inexpensive and simple preliminary cleaning to remove water, filterable sludge and the like, a small amount of certain materials as above described, which effect complete solution of the remaining sludge in the oil, altering it to a condition where it is not substantially prone to reprecipitate and not harmful to the function of the oil, and which also enables the renovated oil, when returned to the equipment from which it was removed, to clean the partially sludge-blocked passages thereof without interruption of service.

Materials for the purposes of this invention must not only have the power to increase the sludge-dissolving power of the oil, but must also have certain other desirable properties. They must be readily miscible with the oil, and must not differ sufficiently from it in boiling point to unduly alter its vapor pressure under conditions of use nor to increase the fire hazard attendant thereon. Equally important is the requirement that such materials, when added to oils in quantities sufficient for the purposes of this invention, shall not materially alter the electrical, heat-removing, and/or lubricating properties of the oil.

It has been found that these properties, coupled with a remarkable capacity for dissolving sludge and rendering it innocuous, are possessed by the materials acetophenone and benzophenone. This invention is based upon this discovery and is directed to the use of these materials for the above defined purposes, and to the method of cleaning such equipment by making use of these materials.

When up to about 10% by weight of the above substance is added to a sludged turbine or transformer oil containing about 0.05 to 0.10% by weight of suspended sludge and the mixture is heated to about 100° C., the sludge will be found to dissolve to a substantially complete degree within a few minutes, and will not be reprecipitated upon cooling to normal room temperature. At the same time, the oil will be found to have suffered no material change in the properties which fit it for use for the purpose for which it is intended.

The process for the renovation of used oils herein contemplated consists of the following steps, viz., the removal of the oil from the equipment in which it is used, a centrifugal or other mechanical separation of suspended sludge, water, and the like; followed by addition of the said material which has high sludge-dissolving power; followed by return of the oil to the equipment. Such operations may, if desired, be performed continuously in certain instances, or the continuous equipment installed for ordinary renovation of oils, as with some turbines, may be assisted by periodic additions to the renovated oils of the sludge-dissolving materials. The sludge-dissolving material may, if desired, be added to the oil in the form of a concentrate solution in fresh oil, which solution sometimes may be prepared conveniently with the aid of heat.

This invention also contemplates the internal cleaning or purging of the equipment of sludge deposited in its interior, and for this purpose makes use of the oil, renovated by the above procedure, and containing sludge-dissolving material in excess of that needed for the ordinary renovation. After the oil, so treated, has been returned to the equipment, as for instance a transformer, in a period of a few days, the exact time depending upon how high the temperature rises in service and how bad the sludge conditions are, the whole interior of the transformer will become clean through the dissolving of the sludge.

As pointed out hereinbefore, it is usual and preferred to add to the deteriorated oil about 10% of its weight of the indicated compounds. More may be added if necessary, the upper limit being controled either by the limit of solubility of the additive compound in the oil, or by the amount which may be aded without seriously altering the necessary physical characteristics of the oil. Benzophenone has an upper limit set by its maximum solubility of about 25%, at which concentration the physical properties of the oil are still satisfactory. Acetophenone is miscible with oil in all proportions, but should not be used in concentrations in excess of about 50%.

I claim:

1. An oil composition for use in turbines, transformers, and the like, capable of cleaning and maintaining clean the interior passages of such equipment against the accumulation of sludge produced by prolonged exposure of oil to conditions and temperatures encountered in such equipment comprising a homogeneous mixture of a mineral oil of suitable lubricating and dielectric qualities and a compound selected from the group acetophenone and benzophenone, said compound present in amounts of about 10% and upwards sufficient to cause solution of sludge in oil.

2. A homogeneous dielectric and lubricating composition for use in turbines, transformers, and the like, composed of a mineral oil, a compound from the group acetophenone and benzophenone, and, dissolved therein, a small amount of the sludge formed by prolonged exposure of the oil alone to the conditions of use, the additive compound being present in amounts of about 10% and upwards sufficient to render the sludge soluble in the mixture and innocuous with respect to the equipment in which the oil is used.

3. Method of operating turbines, transformers, and the like equipment wherein oil is circulated through internal passages under sludge forming conditions comprising circulating through said passages a homogeneous mixture of a mineral oil of suitable lubricant and dielectric properties and a compound selected from the group acetophenone and benzophenone, the said compound being present in sufficient amount to bring about the solution of sludge in the homogeneous mixture and prevent its deposit in the internal passages.

WILLIAM G. HORSCH.